United States Patent
Park et al.

(10) Patent No.: US 7,442,868 B2
(45) Date of Patent: Oct. 28, 2008

(54) APPARATUS AND METHOD FOR PROCESSING RINGTONE

(75) Inventors: Yong Chul Park, Seoul (KR); Jung Min Song, Seoul (KR); Jae Hyuck Lee, Seoul (KR); Jun Yup Lee, Yongin-si (KR)

(73) Assignee: LG Electronics Inc., Seoul (KR)

( * ) Notice: Subject to any disclaimer, the term of this patent is extended or adjusted under 35 U.S.C. 154(b) by 386 days.

(21) Appl. No.: 11/065,786

(22) Filed: Feb. 24, 2005

(65) Prior Publication Data
US 2005/0188822 A1 Sep. 1, 2005

(30) Foreign Application Priority Data
Feb. 26, 2004 (KR) .................. 10-2004-0013132

(51) Int. Cl.
*G10H 7/00* (2006.01)
(52) U.S. Cl. .................. 84/603; 84/609; 84/622; 84/645
(58) Field of Classification Search .......... 84/603, 84/622, 609, 645
See application file for complete search history.

(56) References Cited

U.S. PATENT DOCUMENTS

| | | | |
|---|---|---|---|
| 5,117,726 A * | 6/1992 | Lisle et al. ............... | 84/608 |
| 5,119,711 A * | 6/1992 | Bell et al. ................ | 84/622 |
| 5,315,057 A * | 5/1994 | Land et al. .............. | 84/601 |
| 5,471,006 A * | 11/1995 | Schwartz et al. ........ | 84/609 |
| 5,734,118 A * | 3/1998 | Ashour et al. ........... | 84/609 |
| 5,744,739 A * | 4/1998 | Jenkins .................. | 84/603 |
| 5,837,914 A * | 11/1998 | Schwartz et al. ........ | 84/622 |
| 5,880,392 A * | 3/1999 | Wessel et al. ........... | 84/659 |
| 6,008,446 A * | 12/1999 | Van Buskirk et al. ... | 84/603 |
| 6,096,960 A * | 8/2000 | Scott ..................... | 84/603 |
| 6,225,546 B1 * | 5/2001 | Kraft et al. .............. | 84/609 |
| 6,255,577 B1 * | 7/2001 | Imai ...................... | 84/609 |
| 6,437,227 B1 * | 8/2002 | Theimer ................. | 84/609 |
| 6,525,256 B2 * | 2/2003 | Boudet et al. ........... | 84/645 |
| 6,867,356 B2 * | 3/2005 | Nishimoto ............... | 84/603 |
| 7,126,051 B2 * | 10/2006 | Fay et al. ................ | 84/609 |
| 7,151,215 B2 * | 12/2006 | Hsieh ..................... | 84/603 |
| 2001/0045155 A1 * | 11/2001 | Boudet et al. ........... | 84/645 |
| 2002/0156938 A1 * | 10/2002 | Wong et al. ............ | 709/328 |
| 2002/0170415 A1 * | 11/2002 | Hruska et al. ........... | 84/609 |
| 2003/0012367 A1 * | 1/2003 | Seo ....................... | 379/419 |

(Continued)

FOREIGN PATENT DOCUMENTS

EP 0851649 7/1998

(Continued)

*Primary Examiner*—Lincoln Donovan
*Assistant Examiner*—Christina Russell
(74) *Attorney, Agent, or Firm*—Lee, Hong, Degerman, Kang & Schmadeka

(57) ABSTRACT

Provided are an apparatus and a method for processing a ringtone in a wireless terminal. Position data of sound source samples corresponding to ringtone contents are extracted in advance and then used to play the ringtone. Musical score data are parsed from ringtone contents, and position data of the sound source samples corresponding to the parsed musical score data are extracted and stored in a database. Instead of parsing the sound source samples each time, by storing the position data of the sound source samples corresponding to the musical score data in a database, system load can be reduced during a real time playback of a ringtone.

15 Claims, 3 Drawing Sheets

U.S. PATENT DOCUMENTS

| | | | |
|---|---|---|---|
| 2003/0017808 A1* | 1/2003 | Adams | 455/76 |
| 2003/0135377 A1* | 7/2003 | Kurianski et al. | 704/500 |
| 2004/0077342 A1* | 4/2004 | Cho | 455/418 |
| 2004/0209629 A1* | 10/2004 | Virolainen et al. | 455/466 |
| 2005/0056143 A1* | 3/2005 | Fay | 84/645 |
| 2005/0188819 A1* | 9/2005 | Lin et al. | 84/603 |
| 2005/0211075 A1* | 9/2005 | Desai et al. | 84/645 |
| 2006/0180006 A1* | 8/2006 | Kim | 84/609 |
| 2006/0230909 A1* | 10/2006 | Song et al. | 84/609 |
| 2007/0063877 A1* | 3/2007 | Shmunk et al. | 341/50 |

FOREIGN PATENT DOCUMENTS

| | | |
|---|---|---|
| EP | 1267323 | 12/2002 |
| EP | 1391874 | 2/2004 |

* cited by examiner

APPARATUS AND METHOD FOR PROCESSING RINGTONE

BACKGROUND OF THE INVENTION

1. Field of the Invention

The present invention relates to an apparatus and a method for processing a ringtone in a wireless terminal, more specifically, to an apparatus and a method storing position data of sound source samples.

2. Description of the Related Art

A wireless terminal is a device for making/receiving a phone call or for transmitting/receiving data. Such a wireless terminal includes a cellular phone, a Personal Digital Assistant (PDA), and the like.

A Musical Instrument Digital Interface (MIDI) is a standard protocol for data communication between electronic musical instruments. The MIDI is a standard specification for hardware and data structure that provides compatibility in the input/output between musical instruments or between musical instruments and computers through digital interface. Accordingly, a devices having the MIDI can share contents with each other because compatible data are created therein.

As the wireless terminal has become commonly used, technologies for adding various functions to the wireless terminal have been developed. One of the representative technology is to provide and output various sounds.

One of the technology according to the related art simply plays music provided via automatic response service (ARS) through the wireless terminal. In recent years, however, ringtones can be provided through various routes such as Internet, generation in the wireless terminal. In addition, using the MIDI technology, high-definition ringtone such as 40 or 64 chords can be played.

FIG. 1 is a block diagram illustrating an apparatus for processing a ringtone in a wireless terminal according to the related art.

Referring to FIG. 1, the apparatus 100 includes MIDI-based ringtone contents 110, a ringtone parser 120 for parsing MIDI format for the ringtone contents 110, a sequencer 130 for aligning the parsed information regularly, a sound source 140 where sound source samples are registered as a file format, a sound source parser 150 for parsing the sound source format, a ringtone synthesizer 160 for parsing the sound source samples corresponding to musical scale of the ringtone contents 110 and converting the parsed sound source samples into frequencies corresponding to the respective musical scale, and a control logic unit 170 for requesting the musical scale information of the sequencer 130 and the sound source samples of the sound source parser 150 according to a play order of the ringtone and outputting them to the ringtone synthesizer 160.

An apparatus for processing a ringtone in a related art wireless terminal will now be described with reference to the accompanying drawings.

Referring to FIG. 1, the apparatus 100 performs a frequency conversion in real time according to musical score data of the ringtone contents 110 and generates a sound.

The ringtone contents 110 are MIDI-based contents having musical score data and include contents downloaded from outside via communication.

Except for the basic sound source, most of the ringtone music of the wireless terminal has a MIDI file format. The MIDI file of each track is comprised of numerous musical scales and control signals. When the respective ringtones are played, musical instruments corresponding to the musical scales and additional data corresponding thereto are parsed from the sound source and the sound is created as a result.

The ringtone parser 120 parses the MIDI-based ringtone contents. That is, the ringtone parser 120 parses playback information from the ringtone contents. The playback information includes notes, musical scales, timbres, and musical scale playback duration. The note is a tone of a definite pitch. The timbre is a combination of qualities of a sound that distinguishes it from other sounds of the same pitch and volume.

The sequencer 130 aligns and outputs the musical score data parsed by the ringtone parser 120 in order of playback duration. That is, the sequencer 130 aligns the parsed musical score data with reference to playback duration in tracks or musical instruments so as to play the sound in order of playback duration.

The sound source 140 includes a plurality of sound source samples that are registered in advance. After sampling actual sounds for various musical instruments, information on the respective musical instruments is stored as a WAVE waveform, for example, a wavetable sound source.

Due to an issue of memory capacity in the terminal, the sound source 140 does not register all sound source samples with respect to all musical notes of the respective musical instruments (piano, drum, etc.), but registers several representative sound source samples. That is, instead of having an independent WAVE waveform for a musical scale for each instrument, several sounds are grouped together and one representative WAVE waveform is used commonly for an efficient use of memory.

The sound source parser 150 parses representative sound source(s) corresponding to the musical scale data of the ringtone contents 110 from the sound source 140 to play the ringtone contents 110.

The control logic unit 170 performs communications and control operation for the respective elements. Specially, the control logic unit 170 requests the sound source samples through the sound source parser 150 by using the musical score data aligned by the sequencer 130. Meanwhile, the control logic unit 170 transmits the musical scales and the musical score data to the ringtone synthesizer 160.

The ringtone synthesizer 160 generates musical sounds through the frequency conversion by using the respective musical scales and the representative sound source samples. Since all sound sources for the respective musical instruments are not registered in the sound source samples, the ringtone synthesizer 160 receives several representative sound samples for the respective musical instruments, which are registered in the sound source samples, and generates WAVE waveforms corresponding to all musical scales.

The apparatus synthesizes and outputs the sound source samples corresponding to all musical scales of the ringtone contents 110 in real time. At this point, when playing the music, the process of generating various sound source samples from the sound sources 140 are performed simultaneously. In addition, the above-described operations are performed repeatedly whenever the ringtones are played.

In case of generating 40 or 60 chords, increased system load can become a critical issue during a real-time play of the ringtone. That is, as the number of the notes of the ringtone to be played increases, the process of analyzing the sound source samples and reading the necessary musical scales and the additional data associated with the musical scales must be repeated one or more times, causing the overload of the system.

Further, as the number of the chords of the ringtone to be played increases, the system is overloaded much more when the ringtone is generated using only several sound source samples.

SUMMARY OF THE INVENTION

Accordingly, the present invention is directed to an apparatus and method for processing ringtone that substantially obviates one or more problems due to limitations and disadvantages of the related art.

An object of the present invention is to provide an apparatus and a method for processing a ringtone, in which position data of sound source samples corresponding to a musical score data are stored and the sound source samples are read out.

Another object of the present invention is to provide an apparatus and a method for processing a ringtone, in which position data of sound source samples corresponding to musical score data of inputted ringtone contents are extracted in advance and stored, and a frequency conversion is performed after sound source samples corresponding to the position data of the sound source samples.

Yet another object of the present invention is to provide an apparatus and a method for processing a ringtone, in which position data of sound source samples associated with musical scales are stored in advance and the sound source samples are parsed from the position data, resulting in a reduction of system load during a play of the ringtone contents.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for processing ringtone includes: a ringtone parser for parsing musical score data from inputted ringtone contents; a sequencer for aligning the parsed musical score data in order of duration; a sound source where a plurality of sound source samples are stored; a sound source parser for parsing position information of the sound source samples corresponding to the musical score data; a sound source play information database for storing the position data of the sound source samples and the musical score data, which are matched with each other; a control logic unit for receiving the musical score data aligned by the sequencer, requesting the position data of the sound source samples from the database and sequentially outputting the position data of the sound source samples; and a ringtone synthesizer for reading sound source samples corresponding to the position data of the sound source samples and for generating musical sound corresponding to the musical score data.

In another aspect of the present invention, there is provided an apparatus for processing a ringtone, including: means for parsing musical score data contained in inputted ringtone contents; means for parsing positions of sound samples corresponding to the musical score data; means for storing the musical score data and the position data of the sound source samples, which are matched with each other; and means for reading sound source samples corresponding to the position data of the sound source samples in order of the musical score data and means for converting the sound source samples into musical sounds.

Yet, another aspect of the present invention, there is provided a method for processing a ringtone, including: parsing musical score data of inputted ringtone contents; parsing position data of sound source samples corresponding to the parsed musical score data and storing the position data in a database; and reading the sound source samples corresponding to the position data of the sound source samples and converting the sound source samples into frequencies depending on a playback duration of the musical score data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
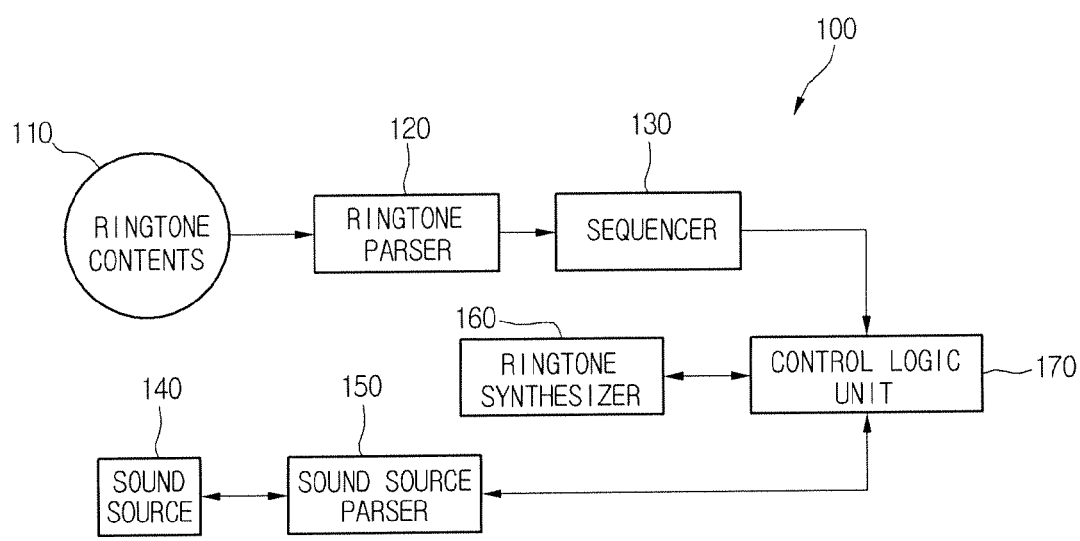
FIG. 1 is a block diagram of an apparatus for processing a ringtone according to the related art.
Figure 2:
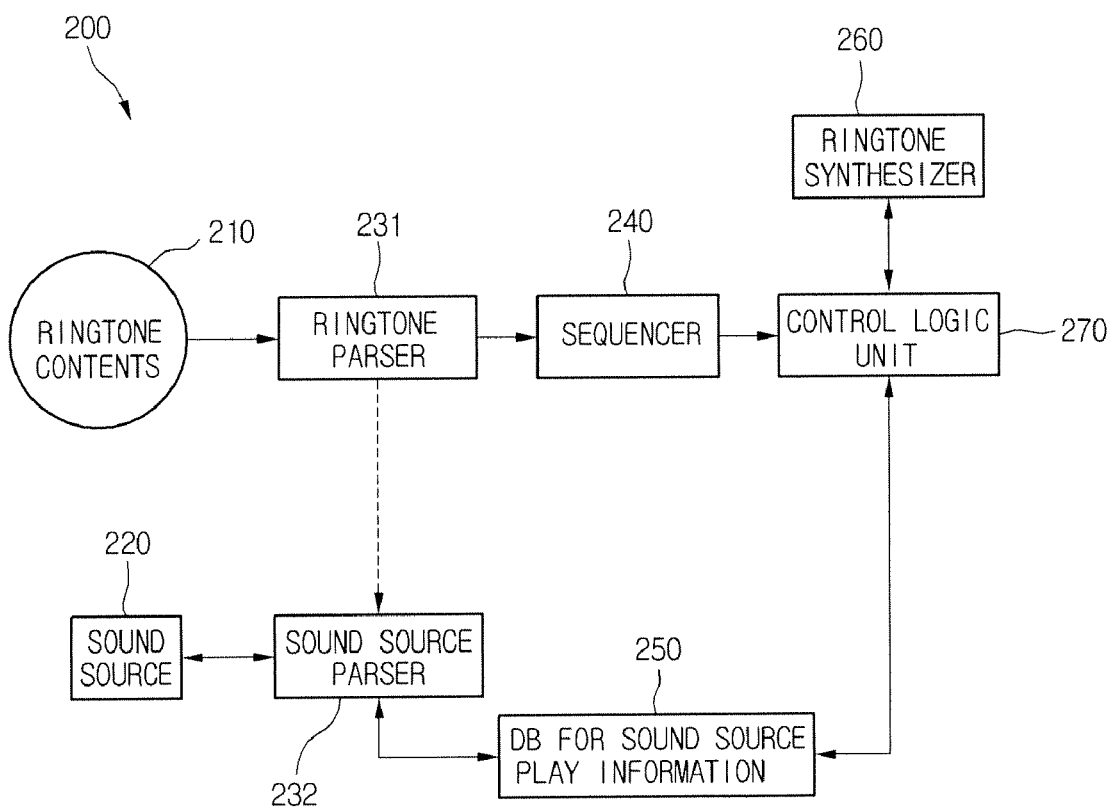
FIG. 2 is a block diagram of an apparatus for processing a ringtone according to an embodiment of the present invention.

FIG. 2 is a block diagram of an apparatus for processing ringtone according to an embodiment of the present invention.

Referring to FIG. 2, the apparatus 200 includes ringtone contents 210, a sound source 220 where a plurality of sound source samples are registered, a ringtone parser 231 for parsing musical score data from the ringtone contents 210, a sound source parser 232 for parsing the sound source samples and position data thereof, a sequencer 240 for aligning the musical score data parsed from the ringtone format in order of playback duration, a sound source play database (DB) 250 for storing position data of sound source samples corresponding to the musical score data, a control logic unit 270 for sequentially outputting the position data of the sound source samples according to the play duration of the musical score data, and a ringtone synthesizer 260 for performing a frequency conversion of the sound source samples corresponding to respective musical scales and for generating musical sounds.

The apparatus 200 extracts the position data of the sound source samples of the sound source 220 with respect to the ringtone contents 210 and stores them in the sound source play information DB 250. Thus, it is unnecessary to parse the position data of the sound source samples during a playback of the ringtone contents 210.

The ringtone contents 210 are MIDI-based contents having a musical score data. Except for basic sound sources, most of the sound sources have MIDI-based music file format. The MIDI format includes numerous musical scales and control signals depending on tracks or musical instruments. When the ringtone is played, musical instruments corresponding to the musical scales and additional data corresponding thereto are received from the sound source play information DB 250, not from the sound source, and then synthesized.

The ringtone parser 231 parses the musical score data of the ringtone contents 210. The musical score data includes notes, musical scales, timbres, musical scale play duration, control signals. Here, the note is a tone of a definite pitch. The timbre is a combination of qualities of a sound that distinguishes it from other sounds of the same pitch and volume. The musical scale is a series of notes differing in pitch according to a specific scheme.

The ringtone contents 210 can be transmitted to a wireless terminal in various manners, such as a download via wireless/wired Internet, automatic response service (ARS) service, generation in the wireless terminal or pre-stored contents.

In the sound source 220, data about the respective musical instruments are stored in a WAVE waveform after the actual sound source samples of the various musical instruments are sampled. The sound source 220 can include sources such as a Pulse Code Modulation (PCM) sound source, a MIDI sound source, and a wavetable sound source. The wavetable sound source stores data about the musical instruments in a WAVE waveform while it is sampling and storing actual sounds of the various musical instruments.

Due to an issue of memory capacity in the terminal, the sound source 220 does not store all sounds with respect to all musical scales of the respective musical instruments (piano, guitar, etc.), but registers several representative sounds. That is, in order for an efficient utilization of the memory, one musical scale in each musical instrument does not have an independent WAVE waveform, but has several sounds which are grouped and one representative WAVE waveform which is used commonly. Here, in order to apply one representative WAVE waveform to the respective musical scale, additional data capable of changing the musical scales are stored in the wavetable sound source 220 along with the WAVE waveform.

When the ringtone parser 231 parses numerous musical scales, notes, timbres, musical scale play duration and control signal according to the tracks of the ringtone contents 210 or musical instruments, the sound source parser 232 receives part of the musical score data from the ringtone parser 231 and parses the position data of the sound source samples.

At this point, the sound source parser 232 receives the musical scales of the musical score data and the timbre data and parses the corresponding sound source samples from the sound source 220.

The sound source parser 232 parses the position data of the sound source samples, matches them with the musical scales and stores them in the sound source play information DB 250. That is, the timbre of the ringtone contents 210 to be played and the position data of the sound samples corresponding to all musical scales are stored in the sound source play information DB 250.

The sequencer 240 aligns the musical score data aligned according to the tracks or musical instruments in an order of a playback duration. That is, when a ringtone is played, the musical score data according to the tracks or musical instruments are aligned with reference to playback duration.

The sound source play information DB 250 stores the sound source play information, including the musical scales of the ringtone contents 210 to be played and the sound source samples corresponding to the musical scales. That is, a position of the WAVE waveform is stored. The position of the sound source sample includes only position data of the sound source sample used by the ringtone contents 210 to be played. For example, only position data of do-sound in the piano is stored.

In other words, the sound source play information DB 250 stores the position data of the sound source samples that have been used repeatedly at least one time. Further, the sound source play information DB 250 stores the musical scales and the timbre data and additional data associated with the musical scales. The timbre data includes a sound source tag or name, a ringtone music tag or name, types of musical instruments, etc.

The control logic unit 270 controls an overall operation of the apparatus for processing the ringtone. Also, the control logic unit 270 controls the communication between the sequencer 240 and the sound source play information DB 250 and between the sequencer 240 and the ringtone synthesizer 260.

The control logic unit 270 receives the musical score data temporally aligned from the sequencer 240 and requests the position data of the sound source samples from the sound source play information DB 250, and then receives the position data of the sound source samples. That is, the control logic unit 270 reads the position data of the sound source samples corresponding to the respective musical scales from the sound source play information DB 250 and outputs them to the ringtone synthesizer 260.

The ringtone synthesizer 260 generates acoustic sound that will be played through a speaker. That is, the ringtone synthesizer 260 reads the sound source sample corresponding to the position of the sound source sample from the sound source play information DB 250 and generates the sound through a frequency conversion.

The ringtone synthesizer 260 generates sounds by using the musical scale and the position data of the WAVE waveform stored in the sound source play information DB 250. Specifically, since the position data of the stored sound source sample of the musical scales are used repeatedly, it is possible to solve the prior art problem of repeatedly requesting the parsing of the sound source 220 from the sound source parser 232.

By previously storing the position data of the sound source samples 220 stored in the sound source play information DB 250 before the play of the ringtone, it is unnecessary to parse repeatedly the position of the sound source samples when the musical scales are repeated several times during a playback of a ringtone. A time delay that might occur during the storing the position data in the DB 250 will be too little to be noticed by a user.

In this manner, when playing the ringtone through the ringtone synthesizer 260, the control logic unit 270 communicates with the sound source play information DB 250 without performing communication with the sound source parser 232. Thus, it is unnecessary to perform the process of parsing repeatedly the sound source 220 so as to read the sound source position information during the play of the ringtone, resulting in a reduction of a system load.

Figure 3:
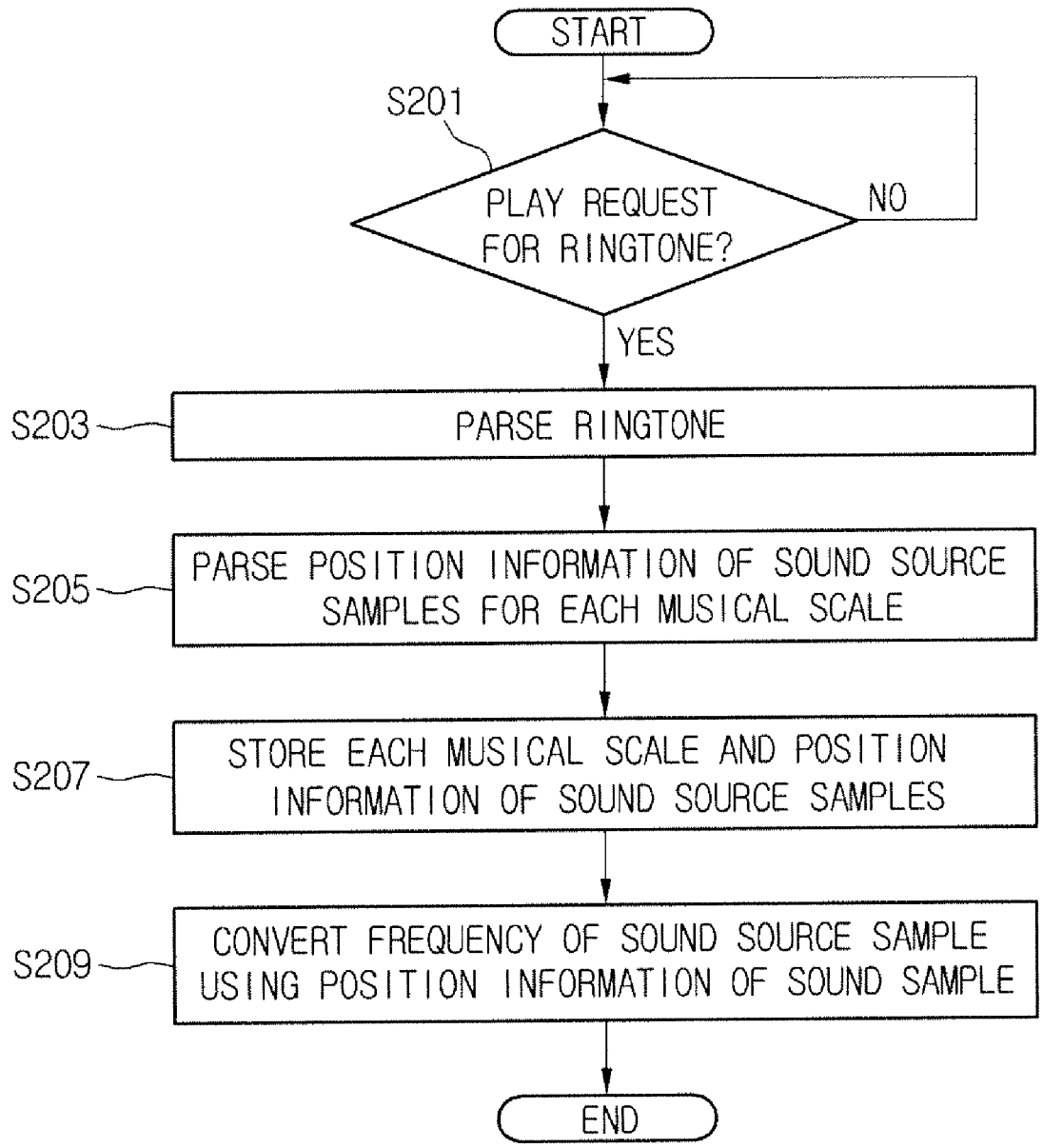
FIG. 3 is a flowchart illustrating a method for processing a ringtone according to another embodiment of the present invention.

FIG. 3 is a flowchart illustrating a method for processing a ringtone according to an embodiment of the present invention.

Referring to FIG. 3, when there is the play request of the ringtone (S201), format of the ringtone contents 210 is parsed (S203). Information on musical scales, notes, timbre and play duration can be obtained according to the parsing result of the bell contents.

Then, the position information of the sound sources 220 corresponding to the respective musical scales and timbres is parsed (S205). The position data of the parsed sound source samples and the respective musical scales are matched and then stored. Prior to playback of a ringtone, the position of the sound source sample is parsed through the bell source parser 232 and matched with the respective musical scales and stored in the DB 250 (S207).

During the step S203, a plurality of musical scales contained in the ringtone contents 210 and timbre data corresponding to the musical scales are parsed and transmitted to the sound source parser and to the sequencer.

In step S205, the position data of the sound source sample corresponding to the musical scale and the timbre data are parsed.

The information stored in the DB 250 is used to find the sound source sample, such as the sound source tag or name, the ringtone music tag or name, the tones of musical instruments, the types of musical instruments, the positions of WAVE waveform of musical instruments, etc. The position information of the WAVE waveform of the musical instrument includes positions of the sound source samples corresponding to the respective musical scales.

When a ringtone is played, the ringtone music is simultaneously synthesized and played using the sound source play information in real time (S209).

According to the present invention, the musical note and the sound source information used more than once are parsed and stored in a database so that the stored information can be used to play a ringtone. Therefore, the system load is reduced and a ringtone can be played smoothly. In addition, numerous chords can be effectively expressed.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for processing a ring tone, comprising:
 a ring tone parser for parsing musical score data from inputted ring tone contents;
 a sequencer for aligning the parsed musical score data in order of playback duration of the musical score data;
 a sound source where a plurality of sound source samples are stored;
 a sound source parsing for parsing position data of the sound source samples corresponding to the musical score data and for matching the position data with the musical score data;
 a sound source play information database for storing the position data of the sound source samples and the musical score data, which are matched with each other;
 a control logic unit for receiving the musical score data aligned by the sequencer, for requesting the position data of the sound source samples from the sound source play information database, and for sequentially outputting the position data of the sound source samples; and
 a ring tone synthesizer for reading sound source samples corresponding to the position data of the sound source samples from the sound source play information database and for generating musical sounds corresponding to the musical score data;
 wherein the sound source parser parses the position data of the sound source sample corresponding to the musical score data and stores the parsed position data in the sound source play information database, and
 wherein the sound source play information database stores musical scale data of the ring tone contents and timbre data corresponding to the musical scale data, which are matched with the position data of the sound source samples, wherein the timbre data includes a sound tag or name, a ring tone music tag or name.

2. The apparatus according to claim 1, wherein the ring tone parser transmits the musical score data parsed from the ring tone contents to the sound source parser.

3. The apparatus according to claim 2, wherein the ring tone parser parses the musical score data which includes musical scale, timbre, musical scale playback duration, and notes contained in the ring tone contents, transmits the parsed data to the sequencer, and transmits the parsed musical scale and the timbre data to the sound source parser.

4. The apparatus according to claim 1, wherein the sound source parser parses the position data of at least one sound source sample corresponding to the musical score data and stores the parsed position data in the sound source play information database.

5. The apparatus according to claim 1, wherein the timbre data are musical instrument data corresponding to the musical scales of the musical score data.

6. The apparatus according to claim 1, wherein the sound source play information database further stores the sound source tag or name and ring tone music tag or name, which correspond to the musical scales of the musical score data.

7. The apparatus according to claim 1, wherein the sound source sample is a wave table sound source.

8. The apparatus according to claim 1, wherein the ring tone contents are downloaded through wireless/wired Internet or automated response service (ARS), generated, or stored in a wireless terminal.

9. The apparatus according to claim 1, wherein the position data of the sound source samples is stored in the sound source play information database prior to playing the ring tone.

10. The apparatus according to claim 1, wherein the position data of the sound source samples are matched with one musical scale.

11. An apparatus for processing ring tone, comprising:
 means for parsing and sequencing musical score data contained in inputted ring tone contents, wherein the musical score data includes notes, musical scales, timbres, and musical scale playback durations;
 means for parsing position data of sound samples corresponding to the musical score data, wherein the position data of the sound source samples are parsed using the musical scale and timbre data of the musical score data;
 means for matching the musical score data with the position data;
 means for storing the musical score data and the position data of the sound source samples in a database;
 means for reading sound source samples corresponding to the position data of the sound source samples in order of the playback duration musical score data; and
 means for converting the sound source samples into music sounds.

12. A method for processing ring tone, comprising:
 parsing and sequencing musical score data from inputted ring tone contents, wherein the musical score data includes notes, musical scales, timbres, and musical scale playback durations;
 parsing position data of sound source samples corresponding to the parsed musical score data, wherein the position data of the sound source samples are parsed using the musical scale and timbre data of the musical score data;
 storing the position data in a database;
 reading the sound source samples corresponding to the position data of the sound source samples; and
 converting the sound source samples into frequencies in order of playback durations of the musical score data.

13. The method according to claim 12, wherein scale and timbre data are considered when parsing the position data of the sound source samples.

14. The method according to claim 12, wherein the position data stored in the database are position data of sound source samples of all musical instruments used for the ring tone.

15. The method according to claim 12, wherein the sound source sample is a wave table sound source.

* * * * *